United States Patent [19]

Schievelbein

[11] 4,161,983

[45] Jul. 24, 1979

[54] HIGH CONFORMANCE OIL RECOVERY PROCESS

[75] Inventor: Vernon H. Schievelbein, Houston, Tex.

[73] Assignee: Texaco Inc., White Plains, N.Y.

[21] Appl. No.: 863,503

[22] Filed: Dec. 22, 1977

[51] Int. Cl.$^2$ .............................................. E21B 43/22
[52] U.S. Cl. ..................................... 166/269; 166/273
[58] Field of Search ...................... 252/8.55 R, 8.55 D; 166/273, 274, 269

[56] References Cited

U.S. PATENT DOCUMENTS

| | | | |
|---|---|---|---|
| 3,294,164 | 12/1966 | Hardy et al. .......................... | 166/274 |
| 3,358,758 | 12/1967 | Hardy et al. .......................... | 166/274 |
| 3,848,673 | 11/1974 | Clampitt et al. ...................... | 166/273 |
| 3,866,680 | 2/1975 | Dauben ................................ | 166/274 |
| 3,890,239 | 6/1975 | Dycus et al. .................... | 252/8.55 X |
| 4,077,471 | 3/1978 | Shupe et al. .......................... | 166/275 |

*Primary Examiner*—Herbert B. Guynn
*Attorney, Agent, or Firm*—Carl G. Ries; Thomas H. Whaley; Jack H. Park

[57] ABSTRACT

The conformance of a water flood oil recovery process, including surfactant or other chemicalized water flood process, in a formation containing at least two zones of varying permeability, the permeability of one zone being at least 50 percent greater than the permeability of the other zone, is improved by water flooding until the higher permeability zone has been depleted, after which a fluid is injected into the high permeability zone, said fluid having relatively low viscosity at the time of injection and containing a particular surface active agent which promotes the formation of a coarse emulsion in the flow channels of the formation which reduces the permeability of the high permeability zone. Since the viscosity of the fluid injected into the previously water flooded, high permeability zone is no greater than water, it is injected easily into the zone and moves through substantially the same flow channels as water would move in the formation. After the permeability of the first zone has been reduced substantially, water flooding may then be accomplished in the second zone which was originally not invaded by the injected water since its permeability was substantially less than the permeability of the first zone. The surface active agent may be tailored to exhibit optimum emulsion formation properties with the particular aqueous fluid present in the flow channels of the formation to be treated.

19 Claims, 2 Drawing Figures

HIGH CONFORMANCE OIL RECOVERY PROCESS

FIELD OF THE INVENTION

This invention concerns a process for use in subterranean formations containing two or more zones which differ from one another in permeability such that water flooding or other enhanced oil recovery processes cannot effectively deplete both zones, resulting in poor vertical conformance. More specifically, the process involves injecting a fluid into the more permeable zone, after it has been depleted by water flooding or other supplemental oil recovery process, which fluid has relatively low viscosity at the time of injection but forms a high viscosity, coarse emulsion with the residual hydrocarbon in the depleted zone to reduce the permeability of that zone to subsequently injected fluids.

BACKGROUND OF THE INVENTION

It is well recognized by persons skilled in the art of petroleum recovery that only a small fraction of the petroleum originally present in a formation can be recovered by primary production, e.g., by allowing the oil to flow to the surface of the earth as a consequence of naturally occuring energy forces, or by so called secondary recovery processes which comprise injecting water into the formation by one or more wells to displace petroleum laterally through the formation toward one or more spaced apart production wells and then to the surface of the earth. Although water flooding is an inexpensive supplemental oil recovery process, water does not displace oil effectively even in those portions of the formation through which it passes, because water and oil are immiscible and the interfacial tension between water and oil is quite high. This too has been recognized by persons skilled in the art of oil recovery, and many surface active agents or surfactants have been proposed for addition to the flood water, which materials reduce the interfacial tension between the injected aqueous fluid and the formation petroleum thereby increasing the microscopic displacement efficiency of the injected aqueous fluid. Surfactants which have been disclosed in the prior art for such purposes include alkyl sulfonates, alkylaryl sulfonates, petroleum sulfonates, alkyl or alkylarylpolyalkoxy sulfates, alkyl- or alkylarylpolyalkoxyalkyl sulfonates, and nonionic surfactants such as polyethoxylated aliphatic alcohols or alkanols, and polyethoxylated alkyl phenols.

Even if the surface tension between the injected aqueous fluid and the petroleum present in the subterranean reservoir can be reduced by incorporating surface active agents into the injected fluid, the total oil recovery efficiency of the process is frequently poor because many subterranean petroleum-containing reservoirs are comprised of a plurality of layers of widely differing permeabilities. When a fluid is injected into such a heterogeneous reservoir, the fluid passes primarily through the most permeable zones and little or none of the fluid passes through the lower permeability zones. If the ratio of permeabilities of the zones is as high as 2:1, essentially all of the injected fluid passes through the more permeable zone to the total exclusion of the less permeable zone. Furthermore, the situation described immediately above causing poor vertical conformance of the injected fluid in a heterogeneous reservoir is aggravated by application of the supplemental oil recovery process itself. If water is injected into a heterogeneous multi-layered petroleum reservoir, water passes principally through the most permeable zone and displaces petroleum therefrom, and as a consequence further increases the permeability of that zone. Accordingly, the difference between the permeability of the most permeable zone and the lesser permeable zone or zones is increased as a consequence of applying a fluid displacement oil recovery process thereto, including water flooding, surfactant flooding, etc.

The above described problem of poor vertical conformance in water flooding operations has also been recognized by persons skilled in the art, and numerous processes have been described in the prior art for treating the formation to correct the problems resulting from injecting an oil-displacing fluid into a formation having two or more zones of significantly different permeabilities. Many of the these processes involve the use of hydrophilic polymers including partially hydrolyzed polyacrylamide, copolymers of acrylamide and acrylic acid or water soluble acrylates, polysaccharides, etc. Unfortunately, the fluids employing these hydrophilic polymers are substantially more viscous than water at the time of injection, and so injection into the zones is difficult and there is little assurance that they will invade the same zones as would water or another aqueous fluid having about the same viscosity as water. Accordingly, the effectiveness has been restricted to reducing the permeability of only the most permeable flow channels in a zone, and is furthermore usually restricted only to the near wellbore zone of the formation, e.g. that portion of the most permeable zone in a formation immediately adjacent to the injection well, because of the difficulty of injecting viscous fluids through great portions of the formation.

In view of the foregoing discussion of the problems associated with poor vertical conformance in heterogeneous formations, it can be appreciated that there is a substantial need for a method of treating such formations to reduce the permeability of the very high permeability zones to force subsequently injected oil displacing fluids to pass into those zones which were originally of lower permeability, and so were not invaded by the first injected fluids.

DESCRIPTION OF THE PRIOR ART

Numerous references suggest the formation of viscous emulsions on the surface, and injecting the emulsion into a subterranean formation for the purpose of decreasing the permeability of a zone substantially more permeable than other zones. These include U.S. Pat. No. 3,149,669; U.S. Pat. No. Re. 27,198 (original patent U.S. Pat. No. 3,443,636); U.S. Pat. No. 3,502,146 (1970); and U.S. Pat. No. 3,866,680 (1975).

SUMMARY OF THE INVENTION

I have discovered a process applicable to subterranean, petroleum-containing formations containing two or more zones, at least one of which has a permeability at least 50 percent greater than the other zone, which will permit more effective water flooding or surfactant flooding in both zones. The process involves first injecting water or other aqueous displacing fluid into the formation to pass through the more permeable zone, displacing petroleum therefrom, until the ratio of injected fluid to formation petroleum of fluids being recovered from the formation reaches a predetermined or economically unsuitable level. This further increases the ratio of the permeability of the most permeable zone to the permeability of the lesser permeable zone or zones. Thereafter an aqueous fluid is injected into the formation, which fluid will pass substantially exclusively into and through the most permeable, previously water flooded zone, which fluid has a viscosity not substantially greater than the viscosity of water, said fluid containing a surfactant which readily emulsifies the residual oil present in the previously water flooded zone. The surfactant present in the injected treating fluid must be one which forms an emulsion with the formation petroleum at a salinity about equal to the salinity of the aqueous fluid present in the previously flooded, high permeability zone, and should also be relatively stable with changes in salinity since there will normally be variations in water salinity from one point in the subterranean formation to another. The emulsion formed should also be stable with time and changes in salinity at the temperature of the formation, in order to maintain the desired reduction of permeability within the treated zone. The surfactant employed in the process of my invention comprises at least two componnts, one of which is an alkylpolyalkoxyalkyl sulfonate such as an alkylpolyethoxy ethyl, propyl, or hydroxypropyl sulfonate, or an alkylarylpolyalkoxyalkyl sulfonate, such as an alkylbenzene, (or alkyl toluene or xylene) polyalkoxy ethyl, propyl or butyl sulfonate. The surfactant mixture will also comprise a nonionic surfactant, specifically an ethoxylated aliphatic or ethoxylated alkylaryl compound such as an ethoxylated aliphatic alcohol or alkanol, or an ethoxylated alkylphenol. The nature of the nonionic surfactant used in combination with the alkyl or alkylarylpolyalkoxyalkyl sulfonate, as well as the ratio of nonionic to alkoxy sulfonate, is chosen so as to optimize the emulsion formation tendency of the surfactant combination with respect to the petroleum and brine present in the portion of the formation to be treated. The optimum surfactants for my process will not ordinarily be an optimum surfactant combination for effective low surface oil displacement surfactant water flooding.

DESCRIPTION OF THE PREFERRED EMBODIMENTS

Figure 1A:
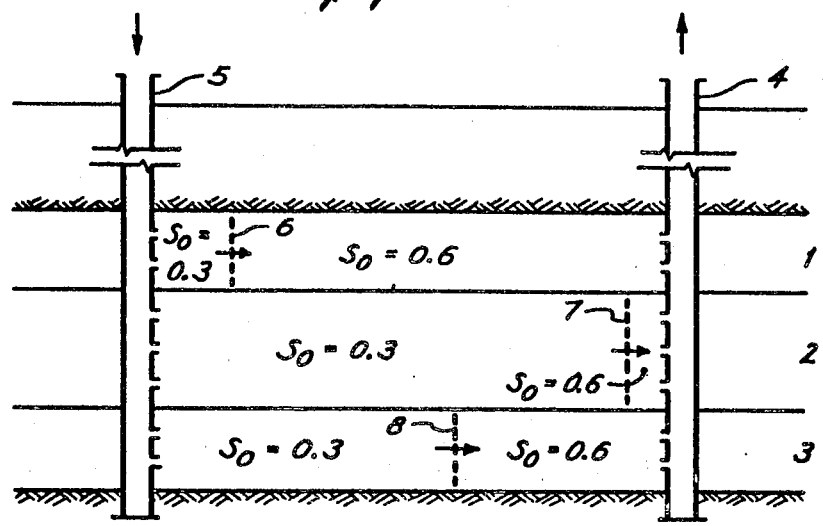
FIG. 1a illustrates a subterranean oil formation containing three zones of different permeabilities, illustrating the interface between an injected fluid and the petroleum in each zone at a time near the economic end of a water flood process.
Figure 1B:
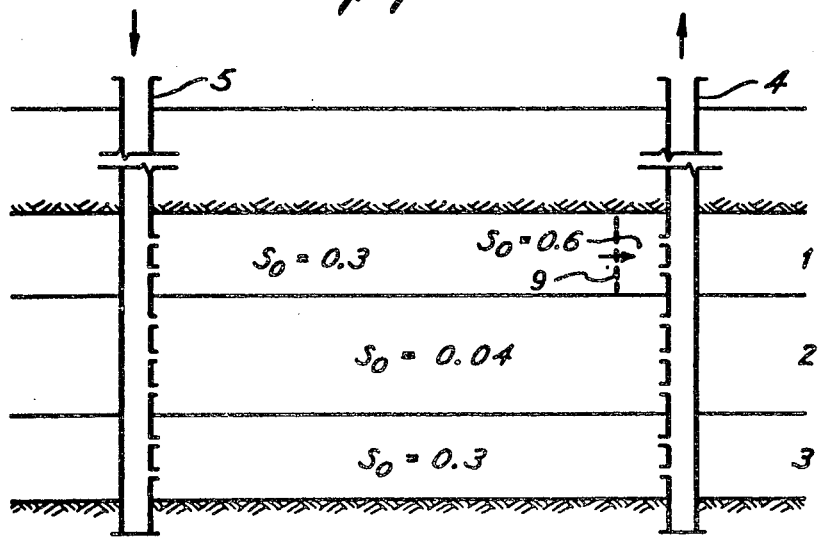
FIG. 1b illustrates the same subterranean formation, after it has been subject to the treatment of the process of this invention, and then subjected to additional water flood.

Briefly, the process of my invention comprises a method of treating a subterranean formation containing at least two zones whose permeabilities are sufficiently different that a fluid injected into a well in communication with both zones will pass primarily through the more permeable zone. Ordinarily, for example, if the permeability to the flow of the injected fluid is at least 50 percent greater than and usually 100 percent greater than the other zone, fluid injected into wells in fluid communication with both zones will pass almost exclusively into the more permeable zone. For example, in a water flood applied to such a formation, water will pass into the more permeable zone exclusively and will displace petroleum towards the production well, with substantially no oil displacement occuring in the lesser permeable zone. After oil has been displaced through the more permeable zone and oil recovery has proceeded to the point at which water breakthrough has occurred at the production well, continued injection of water into the well in communication with both zones will accomplish substantially no additional oil recovery even though the oil saturation in the lesser permeable zone may be substantially the same as it was before commencing water flood or other supplemental oil recovery operations.

Attempts to treat a situation such as that described above by techniques taught in the prior art have been only partially successful for a variety of reasons. Injecting a viscous fluid, which may be either an emulsion formed on the surface for the purpose of plugging the more permeable zone or an aqueous solution of a hydrophilic polymer such as polyacrylamide, partially hydrolyzed polyacrylamide, copolymers of acrylamide and acrylates, polysaccharides, etc., are generally not entirely satisfactory because the more viscous fluid only invades the largest flow channels of the formation, and so does not invade all of the flow channels which would be invaded by a fluid whose viscosity was more nearly equal to the viscosity of water. Furthermore, emulsions formed by for example adding caustic and water to crude oil are not particularly stable with respect of time and are also not stable with respect to changes in the salinity of fluid with which they may be brought into contact. Thus an emulsion which effectively plugs the larger flow channels of a high permeability zone, including one which has previously been water flooded, may be broken later either as a consequence of the passage of time, or as the emulsion contacts pockets of water having greater or lesser salinity, which frequently are found in most subterranean reservoirs. Moreover, there are problems associated with adsorption of hydrophilic polymers, and furthermore many of the hydrophilic polymers are not sufficiently temperature stable to allow them to be used in even moderate temperature formations.

The fluid injected into the formation according to the process of my invention will ordinarily be an aqueous solution containing one or more surfactants, or surface-active agents, which are carefully chosen on the basis of displaying optimum emulsification characteristics. Surfactants which are effective for this purpose, e.g. for forming gross macro-emulsions capable of plugging the flow channels of the formation, are not suitable for low surface tension flooding operations, and will not produce optimum oil displacement in a formation if utilized in a surfactant water flooding process. The reason the surfactants suitable for use in the process of this invention are ineffective for water flooding operations is associated with the fact that when an emulsion is formed, essentially all of the surface active agents which participate in the emulsification reaction, are concentrated at the interface between the discontinuous phase and continuous phase, and so little surfactants remain in the aqueous solution, and so cannot reduce the interfacial tension between formation petroleum and the aqueous fluid present in the flow channels as is necessary to achieve efficient low surface tension displacement of petroleum.

It is necessary that the surfactants utilized in the process of this invention be stable and effective for emulsification in an aqueous fluid having a salinity about equal to the average salinity of the aqueous fluid present in the flow channel of the high permeability zone, e.g. the zone into which the treating fluid is to be injected. Preferably, the surfactant should be identified by tests utilizing actual fluids from the formation, including brine and formation petroleum, since particular characteristics of any of these fluids will affect the efficiency of the surfactant for emulsification of formation petroleum and injected aqueous fluid.

The aqueous emulsifying treating fluid injected into the high permeability zone in practicing the process of my invention contains the following surfactant or surfactants. A sulfonated and ethoxylated surfactant having the following formula:

$$R-(OR')_n-R''SO_3M$$

wherein R is aan aliphatic group, preferably an alkyl, linear or branched, having from 9 to 25 and preferably from 12 to 18 carbon atoms, or an alkylaryl group such as benzene, toluene or xylene having attached thereto at least one alkyl group, linear or branched, having from 9 to 15 and preferably from 10 to 13 carbon atoms; R' is ethylene or a mixture of ethylene and higher molecular weight alkylene with relatively more ethylene than higher molecular weight alkylene; n is a number including fractional numbers, from 2 to 10 and preferably from 3 to 7; R" is ethylene, propylene, hydroxy propylene, or butylene; and M is a monovalent cation such as sodium, potassium, lithium or ammonium.

The above identified surfactant may be substantially the only surfactant present in the treating fluid injected into the high permeability zone. In a slightly different embodiment, the following nonionic surfactant may also be used in combination with the alkyl or alkylarylpolyalkoxyalkyl sulfonate surfactant:

$$R(OR')_nOH$$

wherein R is an aliphatic, such as branched or linear alkyl, containing from 9 to 25 carbon atoms and preferably from 12 to 18 carbon atoms, or an alkylaryl group such as benzene, toluene or xylene having attached thereto at least one alkyl group, linear or branched, containing from 9 to 15 and preferably from 10 to 13 carbon atoms in the alkyl chain; R' is ethylene or a mixture of ethylene and higher alkylene such as propylene with relatively more ethylene than higher alkylene; and n is a number, either whole or fractional, from 1 to 10 and preferably from 2 to 6.

The above identified second component of the treating fluid of my invention is ordinarily employed at a concentration where the fluid is phase stable at the salinity and temperature of the formation into which it is to be injected, over the time period which it must remain in the formation for the completion of the total supplemental oil recovery program to be applied to the formation. The nonionic surfactant is employed where needed to achieve optimum emulsification at the formation conditions using a phase stable solution.

The concentration of the alkyl or alkylarylpolyalkoxyalkyl sulfonate surfactant will ordinarily be in the range of from about 0.01 to about 10 and preferably from about 0.5 to about 4.0 percent by weight. The concentration of the nonionic surfactant, if utilized in the treating fluid in the process of my invention, will ordinarily be from about 0.1 to about 5.0 and preferably from about 0.4 to about 2.0 percent by weight. The ratio of nonionic surfactant to the alkyl or alkylarylpolyalkoxyalkyl sulfonate will ordinarily be from about 0.1 to about 1.0, depending on the salinity of the fluid in which it is formulated, which in turn is usually about equal to the salinity of the fluid present in the subterranean formation.

The volume of treating fluid to be injected into the formation when applying the process of my invention is ordinarily from about 1.0 to about 100 and preferably from 10 to 50 pore volume percent, based on the pore volume of the high permeability zone or zones to be contacted by the treating fluid. It is important to note that the pore volume on which these numbers are based relate to the pore volume of the high permeability zone to be treated, not the pore volume of the whole formation. A near well bore treatment may be effective in oil reservoirs having impermeable shale layers between oil bearing zones. In such reservoirs, the volume of treating fluid is ordinarily from 50 to 100 pore volume percent within the zone radius to be treated.

The procedural steps involved in applying the process of my invention to a subterranean formation are best understood by referring to the attached drawing, to which the following description applies.

A subterranean, petroleum-containing formation is located at depth of about 6200 feet, and it is determined that the total thickness of the formation is 35 feet. The formation is not homogeneous in terms of permeability, however; rather, the formation is made up of three separate layers. The initial oil saturation in all three layers is approximately 30 percent. Oil saturation is designated in the drawing as $S_o$. Zone 1, the top layer in the formation, has a permeability of about 6 md and is approximately 10 feet thick. Zone 2, the middle zone of the formation, has a permeability of about 46 md and is about 15 feet thick. Zone 3, which occupies the lower portion of the formation, is approximately 10 feet thick and has an average permeability of about 15 md.

Water is injected into injection well 5 which is in fluid communication with the full vertical thickness of the formation, i.e., with all three zones of the formation. Since the permeability of zone 2 is substantially greater than the permeability of either zone 1 or zone 3, water flows much more readily into zone 2, and all of the oil production obtained as a consequence of water injection is in fact derived from zone 2. It should be noted that this is not necessarily apparent to operators on the surface of the earth, however. Water injection continues and the interface between the injected water flood and the oil bank that is formed as a consequence of the water flood, is designated as 6 in zone 1 and 7 in zone 2 and 8 in zone 3. At a time just before water breakthrough at the production well 4, the position of interfacial zones 6, 7 and 8 is shown in FIG. 1a. It can be seen that water breakthrough is about to occur at production well 4 from zone 2. Once water breakthrough occurs, further injection of water into well 5 will not recover any significant amount of additional oil from any of the three zones. All of the water injected after breakthough of water at production well 4 will pass into and through zone 2, and essentially no additional water will pass into zones 1 and 3. Thus interfacial zone 6 and 8 will remain approximately where they are shown in FIG. 1a after breakthrough of water into the production well at zone 2, no matter how much additional water is injected into the injection well and flowed through the reservoir. At this time oil production drops off rapidly and the amount of water being produced increases rapidly until further water injection and oil production are no longer economically feasible.

The water that has been utilized for water flooding is itself from the same formation, and so the salinity of the water being injected into the formation and the salinity of water naturally present in the formation is about the same, and it is determined that in this example the salinity of this water is approximately 94,000 parts per million total dissolved solids including 4200 parts per million divalent ions, principally calcium and magnesium. It is desired to formulate a treating fluid suitable for use in such salinity environments, and the surfactant is chosen by a series of laboratory experiments employing actual samples of field water and petroleum from the formation into which the treating fluid is to be injected. After a series of laboratory tests, essentially similar to those to be described later hereinafter below, it is determined that a preferred emulsifying fluid for use in reducing the permeability of zone 2 is a sodium dodecylbenzenepolyethoxyethyl sulfonate containing an average of 3 ethoxy groups per molecule. An unsulfonated, polyethoxylated dodecylbenzene nonionic surfactant is utilized as the phase and emulsion stabilizing agent. The concentration of the sodium dodecylbenzenepolyethoxyethyl sulfonate is approximately 1.3 percent and the concentration of the nonionic surfactant is approximately 0.6 percent by weight.

Since the wells are 150 feet apart, and the formation to be treated is principally zone 2, which is 15 feet thick, and since it is determined that the swept area in a simple two-spot pattern such as this is 11,200 square feet, the volume of formation (30% porosity) to be treated is $(11,200)(15)(0.30) = 50,400$ cu. ft.

A 20 percent pore volume slug is chosen for use in treating the above identified zone. Accordingly, the volume of the solution necessary to treat zone 2 in this example is approximately 2133 cubic meters or 75,398 gallons.

The above described emulsifying fluid is injected into injection well 5. Because the permeability of zone 2 is substantially greater than the permeability of zones 1 and 3 at that time, the difference being even greater than existed at the time water flooding was initiated, it is not necessary to isolate zone 2 from the other zones for the purpose of selectively injecting the fluid into zone 2. Substantially all of the fluid injected into well 5, which is in fluid communication with all the formation, will pass into zone 2. Injection of the treating fluid into zone 2, which causes an emulsion to form in zone 2, reducing the permeability of the zone and additionally recovering some additional oil therefrom, reduces the oil saturation in zone 2 to only 4 percent. Water injection is then again resumed into the formation. Since the permeability of zone 2 has been increased substantially, water injected into well 5 will now flow principally into zones 1 and 3, and so will continue pushing the interface between the injected water and the formation petroleum toward the production well. If water breaks through at producing well 4 before it does in zone 1, it may be necessary to treat zone 3 in about the same fashion as was used to treat zone 2 in the procedural steps described above. If this is accomplished, the water injection may again be resumed, with essentially all of the water passing into zone 1. Water injection is then continued until water again breaks through at well 4, signifying that substantially all of the formation has been swept by water flooding.

After completion of the above described multi-step water flood with intermittent treatment to alleviate the adverse permeability distribution problem, the formation may thereafter be subjected to additional supplemental oil recovery processes such as, for example, surfactant flooding, since the permeability of the formation has now been made more homogeneous and there still remains a substantial amount of petroleum in zones 1 and 3 sufficient to justify the injection of an efficient, low surface tension oil displacing fluid into zones 1 and 3.

For the purpose of illustrating the types of fluids suitable for use in the process of my invention, and illustrating the results obtainable from application thereof, a series of laboratory experiments were performed. Laboratory equipment was especially constructed for these tests, and comprised essentially two separate formation earth core samples encased in holders and arranged for flooding, with the two cores being placed in parallel to simulate the situation similar to that described above, in which an injection well contacts two earth strata of substantially different permeability. Fluids injected into the apparatus will pass predominantly through the highest permeability core to the exclusion of the other core. In all of the experiments described below, the cores were separately water flooded to an irreducable oil saturation prior to being connected in parallel for the purpose of studying the effect of the adverse permeability distribution-correcting treatment of my invention.

In the first experiment, core A was a fresh Berea limestone core having a permeability of 704 millidarcy. The core was 5.08 cm in diameter and 15.8 cm in length and had a total pore volume of 73 cubic centimeters. The porosity was 23 percent. The residual oil saturation after water flooding was 25 percent. Core B utilized in Run 1 was a similar size core having pore volume of 65 cubic centimeters and a porosity of 20 percent, but a much lower permeability, only 139 millidarcy. The residual oil saturation of Core B after water flooding was 35 percent. After the cores were flooded to irreducable water saturation and mounted in parallel, water injection into the cores at a flow rate of 0.9 cc per minute resulted in a receptivity ratio (the ratio of the volume of fluid injected into core A divided by the volume of fluid injected into core B during the same period, when the cores are connected in parallel) of approximately 5.8. During the treatment procedure the receptivity ratio declined to 4.7 and levelled off at 4.0 during the subsequently applied water flood operation. A quantity of petroleum sulfonate solution was then injected, and during the surfactant flood portion of the test, the receptivity declined still further to 2.4. A polymer mobility control buffer was then injected into the system, and the receptivity ratio increased to 4.2 after 0.2 pore volumes of the polymer solution had been injected, and then rose to 5.6 after 1 pore volume of polymer had been injected. It is believed that the increase in receptivity ratio resulting from the fact that the polymer was dissolved in fresh water, which broke the emulsion formed in the course of the treatement procedure described above. Nevertheless, Run 1 clearly illustrates how treatment of two cores in a parallel arrangement, which cores have widely different permeabilities, can reduce the permeability deviation between the two cores and improve the receptivity ratio from 5.8 to 2.4, which is substantially less than half of the original receptivity ratio.

Experiment 2 was performed to verify that in situ emulsification was the mechanism responsible for the improvement in receptivity noted in experiment 1 above. In Run 2, two packs of crushed formation core material were formulated and cleaned. Pack C was saturated with crude oil and pack D was not. Pack C was water flooded to an irreducable oil saturation prior to the treatment. Both packs were treated with 13 pore volume percent of a 30 kilogram/meter$^3$ solution of dinonylphenolpolyethoxyethyl sulfonate (3.8 ethoxy groups per molecule average) and finally flooded with field brine. In this experiment, the packs were not flooded in parallel as was the case in Run 1 above but rather were independently flooded after treatment with the emulsifying fluid. The pressure differential across the packs was determined during the course of the treatment and subsequent water flood as an indication of increasing resistance to fluid flow through the packs. The pack which was originally saturated with oil, water flooded and then treated, experienced a four-fold increase in the pressure required to flood with water in a constant rate flood whereas the pack which contained essentially no oil prior to the treatment experienced less than a 50 percent increase in differential pressure during the course of approximately 3 pore volumes of water flood. This clearly illustrates that oil must be present in the treated formation for the injectivity-reducing emulsification phenomena to be achieved, which is necessary for the treatment described herein to accomplish the desired objective of reducing the permeability of the high permeability zone.

Experiment 3 was comparable to experiment 1, except the treating solution contained 13.6 kg/m$^3$ dodecylbenzene (3.0) polyethoxyethylene sulfonate with 7.6 kg/m$^3$ 3.0 mole polyethoxylated dodecyl phenol and packs were formulated from crushed formation core material. Pack E had 96 millidarcy permeability and Pack F had 20 millidarcy permeability. After the packs were each flooded to irreducable water saturation and mounted in parallel, water injection into the cores at a flow rate of 1.0 cm$^3$ per minute in a receptivity ration (Pack E/Pack F) of 4.6. During the treatment procedure, the receptivity ratio declined to 2.8 and levelled off at 1.0 during the subsequently applied water flood operation. A receptivity ratio of 1 was maintained during injection of petroleum sulfonate solution and the ratio fluctuated between 1.6 and 0.6 during a polymer solution injection. Experiment 3 clearly illustrates that the sulfonate-nonionic mixture can be used to reduce the permeability deviation between two packs.

a gross macroemulsion with residual oil remaining in the flow channels of the flooded portion of a formation after water flooding, thereby reducing the permeability difference between the strata, after which water or other oil displacing fluids may be injected into the formation with substantially improved vertical conformance over that which would be obtained without the permeability adjusting treatment of my invention.

While my invention has been described in terms of a number of illustrative embodiments, it is clearly not so limited since many variations thereof will be apparent to persons skilled in the art of oil recovery without departing from the true spirit and scope of my invention. It is my desire and intention that my invention be limited only by those limitations and restrictions appearing in the claims appended immediately hereinafter below.

I claim:

1. A method of recovering petroleum from a subterranean, petroleum-containing formation, said formation containing at least two distinct petroleum-containing strata or layers, the permeability of at least one of said strata being at least 50 percent greater than the permeability of the other stratum, said formation being penetrated by at least one injection well and by at least one production well, both wells being in fluid communication with substantially all of said formation, comprising (a) injecting a first aqueous oil-displacing fluid into the formation via the injection well, said fluid passing through at least one of the more permeable strata of said formation and displacing oil therein toward the production well, from which it is recovered to the surface of the earth;

(b) after said first aqueous oil displacing fluid has passed through at least one of said more permeable strata to the production well, discontinuing injecting said fluid and injecting into said stratum an aqueous fluid containing an emulsifying surfactant mixture comprising (1) from 0.01 to 10.0 percent by weight of an alkylpolyalkoxyalkylene sulfonate or alkylarylpolyalkoxyalkylene sulfonate having the following formula:

$$R-(OR')_n-R''SO_3M$$

wherein R is an alkyl group, linear or branched, having from 9 to 25 carbon atoms or an alkylaryl group selected from the group consisting of benzene, toluene and xylene having attached thereto at least one alkyl group, linear or branched, having

TABLE I

| Run | Core or Pack | Initial Permeability to Water | Volume of Treating Fluid | Material Used | Receptivity Ratios Prior To Treatment | Receptivity Ratios After Treatment | ΔP After Treatment / ΔP Before Treatment |
|---|---|---|---|---|---|---|---|
| 1 | A | 704 | .14 | 2 | 5.8 | 4.0[1] | — |
|   | B | 139 | .03 |   |     |     |     |
| 2 | C | 75  | 0.13 | 2 | — | — | 4.0 |
|   | D | 65  | 0.17 |   | — | — | 1.4 |
| 3 | E | 96  |      | 3 | 4.6 | 1.0 | — |
|   | F | 20  |      |   |     |     |     |

[1]Reduced to 2.4 on injecting petroleum sulfonate oil displacing fluid
[2]Dinonylphenol (3.8) polyethoxyethyl sulfonate
[3]Dodecylphenol (3.0) polyethoxyethyl sulfonate + dodecylphenol (3.0) polyethoxylate Thus I have disclosed and demonstrated how it is possible to treat a formation containing two or more strata of substantially different permeability so as to reduce the permeability of the more permeable strata, by injecting an emulsifying fluid thereinto which forms from 9 to 15 carbon atoms; R' is ethylene or a mixture of ethylene and higher molecular weight alkylene with relatively more ethylene than higher molecular weight alkylene; n is a number including fractional numbers, from 2 to 10; R" is ethylene, propylene, hydroxy propylene, or butylene and M is a monovalent cation selected from the group consisting of sodium, potassium, lithium and ammonium, and (2) from about 0.1 to about 5.0 percent by weight of a water insoluble nonionic surfactant having the following formula:

R'''(OR'''')$_n$OH wherein R''' is a branched or linear alkyl group having 9 to 25 carbon atoms, or an alkylaryl group selected from the group consisting of benzene, toluene and xylene having attached thereto at least one alkyl group, linear or branched, containing from 9 to 15 carbon atoms, R'''' is ethylene or a mixture of ethylene and propylene with relatively more ethylene than propylene; and n is a number from 2 to 10, said emulsifying surfactants forming a macro-emulsion in the flow channels of the most permeable strata of the formation, thereby reducing the permeability of the strata invaded by the emulsifying fluid; and (c) thereafter injecting a second aqueous oil displacing fluid into the formation, said oil displacing fluid invading at least one stratum not invaded by the oil displacing fluid of step (a) above, displacing petroleum therein toward the production well where it is recovered to the surface of the earth.

2. A method as recited in claim 1 wherein the first oil displacing fluid is water.

3. A method as recited in claim 1 wherein the second oil displacing fluid is water.

4. A method as recited in claim 1 wherein R is an alkyl group containing from 12 to 18 carbon atoms.

5. A method as recited in claim 1 wherein R is alkylaryl group and the number of carbon atoms in the alkyl group is from 10 to 13.

6. A method as recited in claim 5 wherein R is alkylbenzene.

7. A method as recited in claim 1 wherein R' is ethylene.

8. A method as recited in claim 1 wherein the value of n is from 2 to 7.

9. A method as recited in claim 1 wherein R'' is ethylene.

10. A method as recited in claim 1 wherein R'' is propylene.

11. A method as recited in claim 1 wherein R'' is hydroxy propylene.

12. A method as recited in claim 1 wherein R'' is butylene.

13. A method as recited in claim 1 wherein the ratio of the nonionic surfactant to the alkylpolyalkoxyalkylene sulfonate or alkylarylpolyalkoxyalkylene sulfonate is from about 0.1 to about 1.0.

14. A method as recited in claim 1 wherein the concentration of the alkylpolyalkoxyalkylene sulfonate or alkylarylpolyalkoxyalkylene sulfonate surfactant is from about 0.5 to about 4.0.

15. A method as recited in claim 1 wherein the concentration of the nonionic surfactant is from about 0.4 to about 2.0 percent by weight.

16. A method as recited in claim 1 wherein the volume of emulsifying surfactant-containing fluid is from about 1.0 to about 100 pore volume percent based on the pore volume of the strata to be treated thereby.

17. A method as recited in claim 16 wherein the volume of fluid is from about 10 to about 50 pore volume percent.

18. A method as recited in claim 1 wherein said formation contains at least three strata, each differing in permeability from one another, and the steps of injecting said emulsifying surfactant-containing fluid and then resuming injecting said aqueous oil-displacing fluid are applied to the formation at least twice.

19. A method as recited in claim 18 wherein the steps of injecting said emulsifying surfactant-containing fluid and said aqueous oil-displacing fluid are repeated until oil-displacing fluid has swept substantially all of the petroleum-containing strata of said formation.

* * * * *